(12) United States Patent
Chopade et al.

(10) Patent No.: US 11,608,724 B2
(45) Date of Patent: Mar. 21, 2023

(54) ASSOCIATIVE POLYMER FLUID WITH CLAY NANOPARTICLES FOR PROPPANT SUSPENSION

(71) Applicant: Halliburton Energy Services, Inc., Houston, TX (US)

(72) Inventors: Prashant D. Chopade, Lakes Charles, LA (US); Dipti Singh, Kingwood, TX (US); Jeremy A. Holtsclaw, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/522,698

(22) Filed: Nov. 9, 2021

(65) Prior Publication Data
US 2022/0065086 A1 Mar. 3, 2022

Related U.S. Application Data

(62) Division of application No. 16/492,490, filed as application No. PCT/US2017/028881 on Apr. 21, 2017, now Pat. No. 11,203,923.

(51) Int. Cl.
*E21B 43/26* (2006.01)
*C09K 8/66* (2006.01)
*C09K 8/88* (2006.01)
*B82Y 40/00* (2011.01)

(52) U.S. Cl.
CPC .............. *E21B 43/26* (2013.01); *C09K 8/665* (2013.01); *C09K 8/882* (2013.01); *B82Y 40/00* (2013.01); *C09K 2208/10* (2013.01)

(58) Field of Classification Search
None
See application file for complete search history.

(56) References Cited

U.S. PATENT DOCUMENTS

| 4,728,696 A | 3/1988 | Van Phung et al. |
| 6,417,268 B1 | 7/2002 | Zhang et al. |
| 6,823,939 B2 | 11/2004 | Bouwmeester et al. |
| 8,623,792 B2 | 1/2014 | Iverson et al. |
| 10,323,175 B2 | 6/2019 | Cadix et al. |

(Continued)

FOREIGN PATENT DOCUMENTS

| CN | 104419396 | 2/2018 |
| WO | 2016195713 | 12/2016 |

(Continued)

OTHER PUBLICATIONS

ISRWO International Search Report and Written Opinion for PCT/US2017/028881 dated Jan. 15, 2018.
"Hydrophobically modified associating polyacrylamide (HAPAM) synthesized by micellar copolymerization at high monomer concentration" Zhu et al. Dec. 23, 2016.
Publication Notice for U.S. Appl. No. 14/783,727 dated Oct. 13, 2016.

(Continued)

*Primary Examiner* — Andrew Sue-Ako
(74) *Attorney, Agent, or Firm* — Thomas Rooney; C. Tumey Law Group, PLLC

(57) ABSTRACT

Provided herein are methods systems and compositions of a fracturing fluid comprising an associative polymer and clay nanoparticles. A method may comprise: providing a fracturing fluid comprising: a carrier fluid; an associative polymer; and clay nanoparticles; and injecting the fracturing fluid into a subterranean formation at or above a fracture gradient.

20 Claims, 1 Drawing Sheet

(56) References Cited

U.S. PATENT DOCUMENTS

| | | | |
|---|---|---|---|
| 2007/0036977 A1* | 2/2007 | Sinclair | C09K 8/805 |
| | | | 427/212 |
| 2007/0281869 A1 | 12/2007 | Drochon et al. | |
| 2008/0139411 A1 | 6/2008 | Harris et al. | |
| 2008/0149329 A1 | 6/2008 | Cooper et al. | |
| 2010/0071893 A1 | 3/2010 | Caritey et al. | |
| 2014/0054035 A1 | 2/2014 | Nguyen et al. | |
| 2014/0178325 A1* | 6/2014 | Martinez-Castro | A61K 8/86 |
| | | | 507/224 |
| 2015/0047848 A1 | 2/2015 | Bestaoui-Spurr et al. | |
| 2015/0075798 A1 | 3/2015 | Tang et al. | |
| 2015/0284625 A1 | 10/2015 | Silveira et al. | |
| 2016/0122626 A1 | 5/2016 | Dwarakanath et al. | |
| 2018/0362836 A1 | 12/2018 | Schnoor et al. | |

FOREIGN PATENT DOCUMENTS

| | | |
|---|---|---|
| WO | 2018013084 | 1/2018 |
| WO | 2018056984 | 3/2018 |

OTHER PUBLICATIONS

Publication Notice for U.S. Appl. No. 16/492,490 dated Jan. 1, 2021.
Office Action Summary for U.S. Appl. No. 16/492,490 dated Apr. 30, 2021.
Notice of Allowance for U.S. Appl. No. 16/492,490 dated Aug. 13, 2021.

* cited by examiner

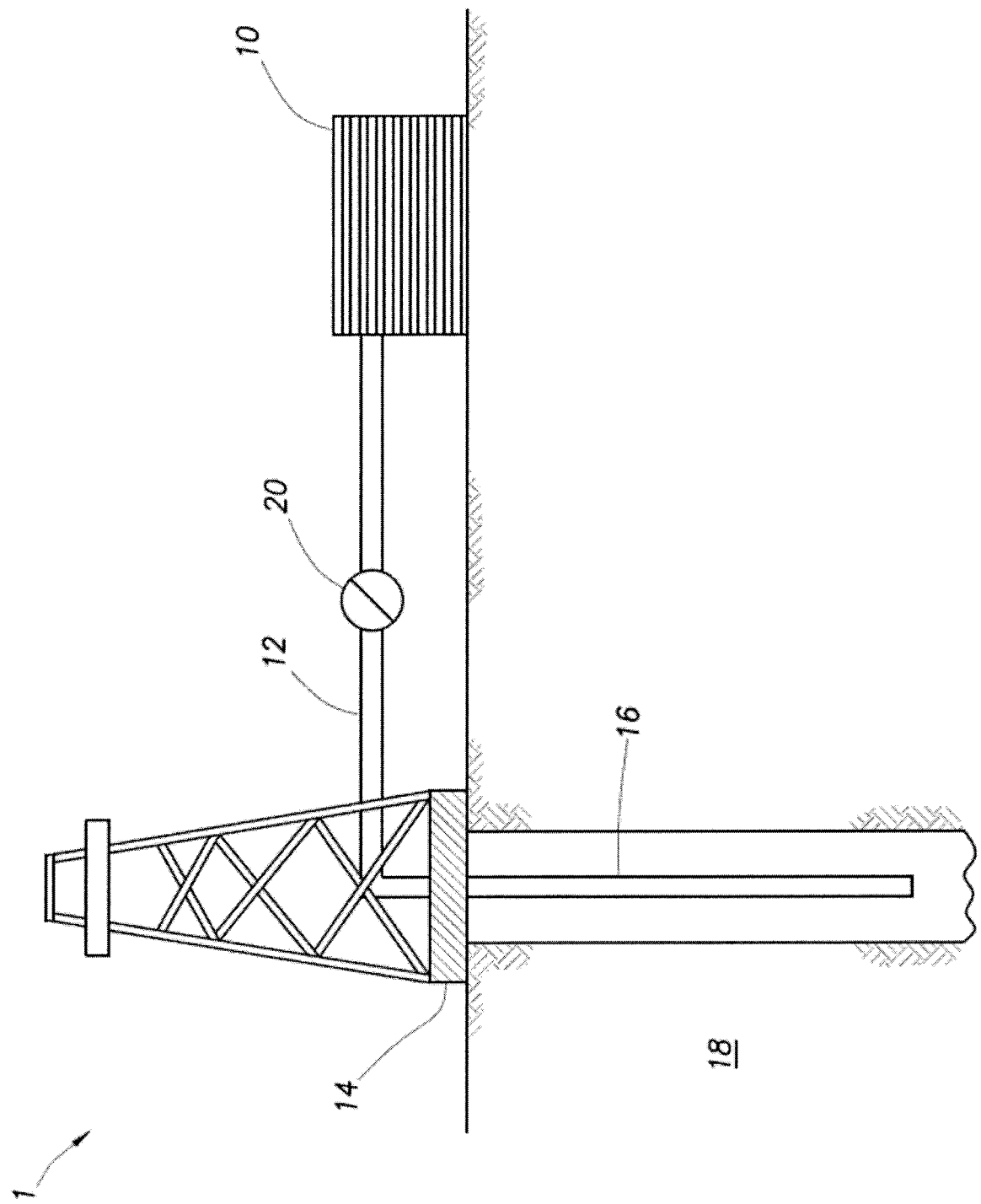

ASSOCIATIVE POLYMER FLUID WITH CLAY NANOPARTICLES FOR PROPPANT SUSPENSION

BACKGROUND

Hydrocarbon-producing wells are often stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore may be increased, enhancing hydrocarbon recovery rates.

A hydraulic fracturing operation may include pumping a fracturing fluid through a wellbore into a subterranean formation. The high pressure may cause the formation to fracture and may allow the fracturing fluid to enter the fractures created in the formation. Fractures may be present in horizontal directions, vertical directions, and intermediate directions therein within the subterranean formation. The horizontal component of the fracture is governed by factors that include the fluid velocity and associated streamlines which help carry proppant to the tip of the fracture. The vertical component is governed by factors that include the particle settling velocity of the proppant and is a function of proppant diameter and density as well as fluid viscosity and density.

Previously, associative polymers have been added to fracturing fluids to reduce proppant settling within fractures with success. Associative polymers may exhibit some gelling capability or viscoelasticity which may help suspend the proppant in solution and allow the transport of proppant into the vertical fractures. Although associative polymers have been used previously, their use has been limited to lower temperature wells. Associative polymers tend to have low thermal stability at temperatures above 200° F. (93° C.) leading them to be unsuitable in medium to high temperature wells.

BRIEF DESCRIPTION OF THE DRAWINGS

These drawings illustrate certain aspects of the present disclosure, and should not be used to limit or define the disclosure.

The FIGURE is a schematic view of a well system utilized for hydraulic fracturing.

DETAILED DESCRIPTION

The systems, methods, and/or compositions disclosed herein may relate to subterranean operations and, in some systems, methods, and compositions, to introduction of a treatment fluid, such as a fracturing fluid, into a subterranean formation penetrated by a wellbore. In particular, a fracturing fluid may include a carrier fluid, an associative polymer, and clay nanoparticles for use in wellbores where temperatures exceed 200° F. (93° C.). Advantageously, the fracturing fluid may provide improved proppant suspension at higher temperatures. The treatment may be performed in an initial fracturing operation or during a re-fracturing operation after an initial fracturing operation has been performed on the subterranean zone.

An associative polymer may gel when hydrated with water. The associative polymers may be water soluble colloid polymers that contain hydrophobic domains. Once hydrated in water, these hydrophobic domains may be capable of self-assembly that may give organized structures and ensuing rheological properties such as the development of gel strength. The hydrophobically modified monomers used in the polymer's synthesis may contain hydrophobic chains typically in the C8 to C22 range. The hydration may cause the associative polymer molecules to interact with one another. The associative polymer may form a network of pseudo-crosslinks and crosslinks that cause the associative polymer to gel in the water. The gelling of the associative polymer may increase the viscosity of the fluid that is gelled and may aid in proppant transport. Increased viscosity in a fluid may decrease the rate or amount of proppant settling out of the fluid. As previously mentioned, the vertical component of the fracture is governed by the particle settling velocity of the proppant. By increasing the viscosity of the fluid, the settling velocity may be slowed and therefore a larger and longer vertical fracture may be created.

Associative polymers may be used in place of viscoelastic surfactants. The associative polymers offer a hybrid solution that is in one part a typical polymer molecule, however, the polymer may be designed and synthesized to contain hydrophobic domains that assemble in an aqueous environment to provide the structure, viscosity, and elasticity that is otherwise not present in typical hydrating polymers. There may also be a hydrophilic domain within the associative polymer.

More generally, the associative polymers may be based on a hydrophilic backbone bearing hydrophobic groups of the type obtained by synthesis pathways of HASE type (direct synthesis pathway) or of HEUR type (post addition of hydrophobic groups to a hydrophilic chain). Use may furthermore be made of associative polymers resulting from micellar radical polymerization processes by copolymerization of hydrophilic monomers and hydrophobic monomers within an aqueous dispersant medium (typically water or a water/alcohol mixture) which comprises: hydrophilic monomers in the dissolved or dispersed state in said medium; and hydrophobic monomers in surfactant micelles formed in said medium by introducing therein this surfactant at a concentration above its critical micelle concentration (cmc).

The hydrophobic monomers present in surfactant micelles used in micellar polymerization may be monomers which, by themselves, may have the property of forming micelles without needing to add additional surfactants. These monomers referred to as being "self-micellizable." The surfactant used may be the self-micellizable hydrophobic monomer itself, used without other surfactant, although the presence of such an additional surfactant is not excluded. Thus, for the purposes of the present description, when mention is made of hydrophobic monomers in surfactant micelles, this notion encompasses both (i) hydrophobic monomers present in surfactant micelles other than these monomers, and (ii) monomers comprising at least one hydrophobic part or block and forming by themselves the micelles in aqueous medium. The two aforementioned embodiments (i) and (ii) are compatible and may coexist. In micellar polymerization, the hydrophobic monomers contained in the micelles are said to be in "micellar solution". The micellar solution to which reference is made is a micro-heterogeneous system that is generally isotropic, optically transparent and thermodynamically stable.

The associative polymers used according to the present invention are polymers obtained according to a process that comprises a step (E) of micellar radical polymerization in which the following are placed in contact, in an aqueous medium (M): hydrophilic monomers, dissolved or dispersed in said aqueous medium (M); hydrophobic monomers in the form of a micellar solution, namely containing, in the dispersed state within the medium (M), micelles comprising these hydrophobic monomers (it being possible in particular for this dispersed state to be obtained using at least one surfactant); at least one radical polymerization initiator, this initiator typically being water-soluble or water-dispersible; and at least one radical polymerization control agent. The aqueous medium (M) used in step (E) is a medium comprising water, preferably in a proportion of about 50% by mass to about 95% by mass, or alternatively, at least about 50% by mass to about 70% by mass, about 70% by mass to about 90% by mass, or about 90% by mass to about 95% by mass. This aqueous medium may optionally comprise solvents other than water, for example a water-miscible alcohol. Thus, the medium (M) may be, for example, an aqueous-alcoholic mixture. According to one possible variant, the medium (M) may comprise other solvents, preferably in a concentration in which said solvent is water-miscible, which may especially make it possible to reduce the amount of stabilizing surfactants used. For example, the medium (M) may comprise pentanol, or any other additive for adjusting the aggregation number of the surfactants. In general, it is preferable for the medium (M) to be a continuous phase of water consisting of one or more solvents and/or additives that are miscible with each other and in water in the concentrations at which they are used. For the purposes of the present description, the term "radical polymerization control agent" means a compound that is capable of extending the lifetime of the growing polymer chains in a polymerization reaction and of giving the polymerization a living or controlled nature. This control agent is typically a reversible transfer agent as used in controlled radical polymerizations denoted by the terminology RAFT or MADIX, which typically use a reversible addition-fragmentation transfer process. The radical polymerization control agent used in step (E) may be a compound which comprises a thiocarbonylthio group —S(C=S)— or it may be a compound which comprises a xanthate group (bearing —SC=S—O— functions), for example a xanthate. According to one particular embodiment, the control agent used in step (E) may be a polymer chain derived from a controlled radical polymerization and bearing a group that is capable of controlling a radical polymerization. Thus, for example, the control agent may be a polymer chain (in general, hydrophilic or water-dispersible) functionalized at the chain end with a xanthate group or more generally comprising a group —SC=S—, for example obtained according to the MADIX technology. Alternatively, the control agent used in step (E) may be a non-polymeric compound bearing a group that ensures the control of the radical polymerization, especially a thiocarbonylthio group —S(C=S)—. The radical polymerization control agent used in step (E) may be a polymer, or an oligomer, of water-soluble or water dispersible nature and bearing a thiocarbonylthio group —S(C=S)—, for example a xanthate group —SC=SO—. This polymer, which is capable of acting both as a polymerization control agent and as a monomer in step (E), is also may be referred to as a "prepolymer." Typically, this prepolymer is obtained by radical polymerization of hydrophilic monomers in the presence of a control agent bearing a thiocarbonylthio group —S(C=S)—, for example a xanthate. In this step, the following may typically be placed in contact: hydrophilic monomers, such as to those used in step (E); a radical polymerization initiator; and a control agent bearing a thiocarbonylthio group —S(C=S)—, for example a xanthate. The use of the abovementioned step prior to step (E) makes it possible, schematically, to hydrophilize a large number of control agents bearing thiocarbonylthio functions (for example xanthates, which may be hydrophobic by nature), by converting them from prepolymers that are soluble or dispersible in the medium (M) of step (E). A prepolymer synthesized in the above step may have a short polymer chain, for example comprising a sequence of less than 50 or less than 25 monomer units, for example between 2 and 15 monomer units. The conditions of step (E) may make it possible to combine the advantages both of controlled radical polymerization and of micellar polymerization. The presence of micelles in the polymerization medium may not affect the action of the control agents, which make it possible to perform a controlled polymerization of the monomers present in the aqueous medium in a similar manner to a controlled radical polymerization performed in homogeneous medium, thus making it possible very readily to predict and control the average molar mass of the synthesized polymer (this mass is proportionately higher the lower the initial concentration of control agent in the medium, this concentration dictating the number of growing polymer chains).

In addition to this control of the polymerization of the monomers, not obtained in the more usual micellar polymerization processes, the use of step (E) of the process of the invention in addition may make it possible, also completely attain polymers having both a large and controlled size. Under the conditions of step (E), it may be possible to control the number-average molar mass of the polymers which makes it possible, inter alia, to produce polymers having low masses. The associative polymer present in the fracturing fluid may be synthesized according to the aforementioned step (E) and has a mass of between 50 000 and 10 000 000, preferably of between 750 000 and 5 000 000 g/mol, in particular between 1 000 000 and 4 000 000 g/mol. Such polymers may be used at a concentration below their critical overlap concentration. On account of their small sizes, such polymers may diffuse at the interfaces and participate in modifying the properties of these interfaces or surfaces.

The associative polymer may have a molecular weight in the range from about 10,000 Daltons to about 10,000,000 Daltons. The molecular weight range from about 500,000 Daltons to about 1,500,000 Daltons. This molecular weight may vary between individual molecules of the associative polymer in the treatment fluid (e.g., a range of molecular weights may be present in a treatment fluid). One of ordinary skill in the art with the benefit of this disclosure should recognize the appropriate size for a given application.

Suitable associative polymers generally may include, but are not limited to, acrylamide, methacrylamide, acrylate, and methacrylate polymers. In general, the polymers may be partially hydrolyzed to introduce some carboxylic groups into the chain. The presence of these charged units may improve water solubility and may increase hydrodynamic volume of the chain due to the mutual repulsion of the negative charges.

The polymer includes one or more hydrophobic segments. As used herein, the term "hydrophobic segment" refers to the portion of the associative polymer additive having at least one hydrophobe. In an embodiment, the hydrophobe may include from 1 to 24 carbon atoms, 4 to 24 carbon atoms, or 10 to 24 carbon atoms, and may include saturated, unsaturated, aliphatic (including linear, cyclic, and branched aliphatic compounds or groups), and/or aromatic compounds or groups. Suitable hydrophobes may include, but are not limited to, linear or branched alkyl, alkenyl, cycloalkyl, aryl, alkaryl, aralkyl hydrocarbons, and halo-substituted alkyl, cycloalkyl, aryl, alkylaryl, acryloyl, arylakyl hydrocarbons, and mixtures thereof. While not wishing to be limited by theory, the hydrophobic segments are believed to form associations via, e.g., physical crosslinks, Van der Waals forces, and/or electrostatic interactions with each other or with additional components in the treatment fluid.

The hydrophobic segment may be connected to the water-soluble polymer backbone through a coupling functional group. The coupling functional groups of the associative polymer may provide the reactivity and bonding sites to chemically bond the water-soluble polymer backbone to the hydrophobic segment. The coupling functional group may generally include any functional group capable of forming a bond between the water-soluble polymer backbone and a hydrophobe. The coupling functional group may include, but is not limited to, a group such as a hydroxyl, a carboxyl, an ether, an ester, a sulfhydryl, and an isocyanate, derivatives thereof, or combinations thereof. Other coupling functional group may include, but are not limited to, an amino group, an ethylenic unsaturated group, an epoxide group, a carboxylic acid group, a carboxylic ester group, a carboxylic acid halide group, an amide group, a phosphate group, a sulfonate group, a sulfonyl halide group, an organic silane group, an acetylene group, a phenol group, a cyclic carbonate group, an isocyanate group, and a carbodiimide group.

The number of hydrophobic segments per molecule of the associative polymer should be sufficient to generate intermolecular interactions in an aqueous solution to allow for the formation of an associative polymer network. An associative polymer network may be a mass of associative polymer molecules that are interacting in a solution though intermolecular forces. The associative polymer may generally include, but is not limited, at least 0.25 to about 25 hydrophobic segments per molecule. The associate polymer may include from about 0.5 to about 10 hydrophobic segments per molecule. The number of hydrophobic segments per molecule of the associative polymer may be altered through variations in the reactant concentrations during manufacturing of the associative polymer additive.

The hydrophobic segments on the associative polymer may include, but are not limited to, from about 5% to about 50% by weight of the total associative polymer. Alternatively, the hydrophobes may be present in the associative polymer in any amount, including, but is not limited, from about 10% to about 40%, or about 5% to about 40%, or about 15% to about 30% by weight of the total associative polymer molecule. As noted above, the weight fraction of the hydrophobe portion of the molecule should be sufficient to generate the desired intermolecular interactions between the associative polymer molecules in an aqueous solution.

The associative polymer that may be used to form the associative polymer networks of the present disclosure may be synthesized by incorporating hydrophobic segments within a water-soluble polymer backbone using any suitable method. Suitable methods include chain growth polymerization, step growth polymerization, and post-polymerization mechanisms for naturally occurring polymers and polymers that were made by chain or step growth polymerization. Specific examples may include, but are not limited to: reacting hydrophobes with a water-soluble polymer reactant containing coupling groups or corresponding coupling group pre-cursors to form the associative polymer additive; reacting condensation monomers and/or prepolymers along with a coupling group precursor to form condensation polymers, wherein one of the reactants provides the requisite hydrophobe content on the final associative polymer additive; and reacting olefinically unsaturated monomers and/or prepolymers by addition polymerization, wherein at least one of the reactants contains the requisite hydrophobe content for the final associative polymer additive. In most instances, this is not post-polymerization modification. Thus, the hydrophobic modification is incorporated within the polymer structure as it forms. However, in some instances, this modification may be performed post-polymerization, for example, through a suitable modification reaction. Residual monomer may remain in the polymer.

The degree of rheological modification attributable to the associative polymer additive may depend on a variety of factors, including, but not limited to, the degree of hydrophobic modification on the associative polymer additive, the microstructure of the associative polymer additive, and the concentration of the associative polymer additive in the treatment fluid. Intrapolymer interactions may become more prominent at low polymer concentrations and high hydrophobic segment density along the water-soluble polymer backbone. In such instances, a compact, globular conformation may be formed giving rise to organized, hydrophobic microdomains in the network with micelle-like properties. In alternative, interpolymer interactions may be more prominent, usually at lower hydrophobe/water-soluble polymer backbone ratios and at higher associative polymer additive concentrations. A high associative polymer additive concentration may lead to chain overlap and hydrophobic clustering that increases the viscosity of the treatment fluid by forming an associative polymer network. One of ordinary skill in the art, with the benefit of this disclosure, will recognize the conditions necessary to obtain the proper intrapolymer and interpolymer associations to form the associative polymer networks of the present invention.

Associative polymers may be included in the fracturing fluid in any amount suitable for a particular amount to create a fluid with the desired rheological properties such as viscosity, including, but not limited to, an amount of about 1 lb/1000 gal (0.1198 kg/m$^3$) to about 60 lb/1000 gal (7.188 kg/m$^3$). Alternatively, about 1 lb/1000 gal (0.1198 kg/m$^3$) to about 5 lb/1000 gal (0.6 kg/m$^3$), about 5 lb/1000 gal (0.6 kg/m$^3$) to about 15 lb/1000 gal (1.797 kg/m$^3$), about 15 lb/1000 gal (1.797 kg/m$^3$) to about 25 lb/1000 gal (2.995 kg/m$^3$), about 25 lb/1000 gal (2.995 kg/m$^3$) to about 30 lb/1000 gal (3.594 kg/m$^3$), about 30 lb/1000 gal (3.594 kg/m$^3$) to about 50 lb/1000 gal (5.99 kg/m$^3$), or about 50 lb/1000 gal (5.99 kg/m$^3$) to about 60 lb/1000 gal (7.188 kg/m$^3$). As used herein, lb/1000 gal refers to pounds of associative polymer per 1000 gallons of fluid the associative polymer is added to.

As previously mentioned, associative polymers have low thermal stability and will generally not work in wells above 200° F. Bonds formed with the associative polymer to oil, water, and other associative polymer molecules may be weak and therefore may be sensitive to elevated temperatures. High temperatures may lead to decreased gelling performance of the associative polymer. If the temperature is too high, the associative polymer may completely lose the ability gel and the proppant may settle out of the fluid. Although polymer gel stabilizers have been used to increase thermal stability of existing fracturing fluids including associative polymers, the gel stabilizers in combination with associative polymers fail to provide fluids with proppant suspension for long durations, especially at elevated temperatures.

Clay nanoparticles may be included in the fracturing fluid to increase the thermal stability of associative polymers. Clay nanoparticles may be clay particles with at least one dimension such as length, width, thickness, or cross-section, of less than 1 micron. Clay nanoparticles may impart an additional interactive surface within the network of hydrated associated polymer. The clay nanoparticles may migrate to the interstitials between hydrated associative polymers and thereby interact with the molecules. Additional surface interaction may improve and extend the thermal stability of the network of associative polymer gel allowing the associative polymer to be used in applications above 200° F.

The clay nanoparticles may include any clay that exhibits the desired properties of surface interaction. Clays may be selected based on other properties they exhibit in solution such as increased viscosity or gelling and thermal-viscosity stability. In particular, clays may, without limitation, be selected from the smectite group (smectites), modified clays, synthetic clays, and hectorite. In some examples, the clay may include a hectorite clay. Hectorite clay may be especially advantageous as illustrated in selected examples below. Other clays from the smectite group that potentially may be used include clays such as montmorillonite and bentonite. The clay may be a synthetic clay or a naturally occurring clay. Some examples of a synthetic clay may include, but are not limited to, a synthetic hectorite or a synthetic bentonite. The clay nanoparticles may be included in any amount to create a fluid with the desired viscosity and other properties, including, but not limited to, an amount of about 0.5% to about 10% by weight of the associative polymer. Alternatively, the clay nanoparticles may be included in an amount of about 0.5% to about 1%, about 0.5% to about 5%, about 1% to about 5%, about 5% to about 10%, about 10%, or about 1% to about 2% by weight of the associative polymer. One of ordinary skill in the art, with the benefit of this disclosure, should be able to select an appropriate kind and amount of clay nanoparticles for a particular application.

The clay nanoparticles may have a mean particle size of less than about 200 nanometers (nm). One of ordinary skill in the art should be able to determine a mean particle size with standard laboratory equipment such as automated particle size analyzers, such as by laser diffraction with a Malvern Mastersizer™ 3000 laser diffraction particle size analyzer. The clay nanoparticles may have a mean particle size at a point of about 1 nm, about 2 nm, about 3 nm, about 4 nm, about 50, about 100, about 150, about 197 nm, about 198 nm, about 199 nm, or about 200 nm. The mean particle size of the nanoparticles may be in the range of from about 1 nm to about 50 nm. The mean particle size of the solid nanoparticles may be in the range of from about 5 nm to about 50 nm. The mean particle size of the solid nanoparticles may be in the range of from about 5 nm to about 200 nm. One of ordinary skill in the art, with the benefit of this disclosure, should be able to determine the appropriate size of the solid nanoparticles in the treatment fluid for a particular application.

As previously mentioned a fracturing fluid may include a carrier fluid, an associative polymer, and clay nanoparticles. Examples of carrier fluids may include, but are not limited to, aqueous fluids, non-aqueous fluids, slickwater fluids, aqueous gels, viscoelastic surfactant gels, foamed gels, and emulsions, for example. Examples of suitable aqueous fluids may include, but are not limited to, fresh water, saltwater, brine, seawater, and/or any other aqueous fluid that may not undesirably interact with the other components used in accordance with the present disclosure or with the subterranean formation. Examples of suitable non-aqueous fluids may include, but are not limited to, organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers to water to produce what is known in the art as "slick-water." Suitable aqueous gels may generally include an aqueous fluid and one or more gelling agents. Suitable emulsions may be included of two immiscible liquids such as an aqueous fluid or gelled fluid and a hydrocarbon. Foams may be created by the addition of a gas, such as carbon dioxide or nitrogen. Additionally, the carrier fluid may be an aqueous gel included of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the carrier fluid transport significant quantities of suspended particulates. The density of the carrier fluid may be increased to provide additional particle transport and suspension in some applications.

The fracturing fluid may include any number of optional additives, including, but not limited to, salts, acids, fluid loss control additives, gas, foamers, corrosion inhibitors, scale inhibitors, catalysts, clay control agents, biocides, friction reducers, iron control agent, antifoam agents, bridging agents, dispersants, hydrogen sulfide ("$H_2S$") scavengers, carbon dioxide ("$CO_2$") scavengers, oxygen scavengers, lubricants, viscosifiers, breakers, weighting agents, inert solids, emulsifiers, emulsion thinner, emulsion thickener, surfactants, lost circulation additives, pH control additive, buffers, crosslinkers, stabilizers, chelating agents, mutual solvent, oxidizers, reducers, consolidating agent, complexing agent, particulate materials and any combination thereof. With the benefit of this disclosure, one of ordinary skill in the art should be able to recognize and select a suitable optional additive for use in the fracturing fluid.

The fracturing fluid may further include other additives. The additives may include a dispersing agent. Dispersing agents may include any chemical that disrupts the surface interactions of proppant and potential flocculating agents in the fracturing fluid. Some examples of dispersants may include, but are not limited to, aminosilanes, acacia gum, acrylamide copolymer, acrylate copolymers and their ammonium salts, acrylic acid homopolymer, carboxylate and sulfonate copolymer, coglycerides, dicaprylyl carbonate, maleic anhydride, phosphinocarboxylic acid, polyacrylic acid, propylheptyl caprylate, sodium acrylate homopolymer, and sodium nitrite. The additives may be present in any concentration, including, but not limited to, an amount of about 1 to about 50 gallons per thousand (OPT) which is equivalent to about 1 to about 0.50 liters per thousand (LPT). Alternatively, about 1 to about 10 GPT (LPT), about 10 to about 20 GPT (LPT), about 20 to about 30 GPT (LPT), about 30 to about 40 GPT (LPT), about 40 to about 50 GPT (LPT), about 1 to about 25 GPT (LPT), or about 25 to about 50 GPT (GPT). GPT and LPT refer to gallons of additive per thousand gallons of fluid the additive is placed in. One of ordinary skill in the art, with the benefit of this disclosure, should be able to select appropriate additives and concentrations for a particular application.

The fracturing fluid may further include a proppant. Proppants may include any suitable material. In general, particles of the proppant should have a crush strength higher than the fracture gradient of the formation so as to avoid crushing the proppant. Proppants should also be resistant to chemical attack from chemicals present in the subterranean formation and from chemicals added to the fracturing fluid.

Some suitable proppants may include, but are not limited to, silica sand, calcium carbonate sand, resin coated sand, ceramic proppants, fly ash, and sintered bauxite. Other solid particulates suitable of use as proppant particulates may include fly ash, desert sand, beach sand, brown sand, white sand, ceramic heads, glass heads, bauxite grains, sized calcium carbonate, and walnut shell fragments. The proppant particulates may include any density. In some examples, proppant particulates may be classified as lightweight or low density and may have a density of about 1.25 g/cm$^3$ to about 2.2 g/cm$^3$. Using low density proppant have several advantages including but not limited to increased conductivity, easier placing with low viscosity fluids, and more uniform distribution within a fracture. Proppant may include any shape, including but not limited, to spherical, toroidal, amorphous, planar, cubic, or cylindrical. Proppant may further include any roundness and sphericity. Without limitation, the proppant may have a mean particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out. Proppants may also include micro-proppants. As used herein, the term "micro-proppant" refers to proppant having a mean particle size of less than about 150 microns. Micro-proppants may include any suitable particle size. Micro-proppants may include a mean particle size from about 0.01 micron to about 500 microns, about 0.1 micron to about 100 microns, about 100 microns to about 200 microns, about 200 microns to about 300 microns, about 300 microns to about 400 microns, about 400 microns to about 500 microns, about 1 micron to about 250 microns, or about 250 microns to about 500 microns.

Proppants may be present in the fracturing fluid in any concentration or loading. Without limitation, the proppant particulates may be present in an amount of about 1 pounds per gallon ("lb/gal") (0.1198 kg/L) to about 20 lb/gal (2.396 kg/L), about 1 lb/gal (0.1198 kg/L) to about 5 lb/gal (0.0.6 kg/L), about 5 lb/gal (0.6 kg/L) to about 10 lb/gal (1.198 kg/L), about 10 lb/gal (1.198 kg/L) to about 15 lb/gal (1.797 kg/L), about 15 lb/gal (1.797 kg/L) to about 20 lb/gal (2.396 kg/L), about 1 lb/gal (0.1198 kg/L) to about 10 lb/goal (1.198 kg/L), or about 10 lb/gal (1.198 kg/L) to about 20 lb/gal (2.396 kg/L). With the benefit of this disclosure, one of ordinary skill in the art should be able to select an appropriate proppant and loading.

The proppant may include an electrically charged surface. In some examples, the proppant surface charge may be negative or anionic. Some fracturing fluid additives may include surface charges that are opposite of the proppant. In some examples, clay control agents and friction reducing agents may include positive surface charges. In solution, the particles of opposite charges may interact which may cause the proppant to flocculate and fall out of solution. The addition of a dispersing agent may reduce the interactions between the opposite-charged molecules thereby reducing or eliminating the flocculating of proppant.

A fracturing fluid may be prepared in any suitable way. One method for preparing a fracturing fluid including an associative polymer may include hydrating an associative polymer and then adding the hydrated polymer and clay nanoparticles to a carrier fluid.

Statement 1. A method comprising: providing a fracturing fluid comprising: a carrier fluid; an associative polymer; and clay nanoparticles; and injecting the fracturing fluid into a subterranean formation at or above a fracture gradient.

Statement 2. The method of statement 1 further comprising hydrating the associative polymer prior to combining the associative polymer with the carrier fluid.

Statement 3. The method of statement 1 or statement 2 wherein the carrier fluid comprises an aqueous fluid or a slickwater fluid.

Statement 4. The method of any preceding statement wherein the associative polymer comprises a acrylamide polymer, methacrylamide polymer, acrylate polymer, methacrylate polymer, or combinations thereof.

Statement 5. The method of any preceding statement wherein the associative polymer comprises at least one hydrophobe.

Statement 6. The method of statement 4 wherein the at least one hydrophobe comprises from 1 to 24 carbons.

Statement 7. The method of any preceding statement wherein the clay nanoparticles comprise hecrotite, smectite, or combinations thereof.

Statement 8. The method of any preceding statement wherein the clay nanoparticles are present in an amount of about 0.5% to about 10% by weight of the associative polymer.

Statement 9. The method of any preceding statement wherein the clay nanoparticles have a mean particle size of less than 200 nm.

Statement 10. The method of any preceding statement wherein the fracturing fluid further comprises a proppant.

Statement 11. The method of any preceding statement wherein the step of injecting comprises alternately injecting a proppant laden fluid and a proppant free fluid.

Statement 12. The method of any preceding statement wherein the subterranean formation comprises at least one zone comprising a temperature of above 200° F.

Statement 13. The method of any preceding statement wherein the step of injecting comprises injecting into a tubular penetrating a subterranean formation, wherein the tubular is connected to a pump configured to deliver the fracturing fluid though the tubular into the subterranean formation.

Statement 14. The method of any preceding statement wherein the step of providing comprises hydrating the associative polymer.

Statement 15. The method of statement 14 wherein the associative polymer is hydrated in a hydration tank.

Statement 16. A fracturing fluid comprising: a carrier fluid; an associative polymer; and clay nanoparticles.

Statement 17. The fracturing fluid of statement 16 wherein the associative polymer comprises a acrylamide polymer, methacrylamide polymer, acrylate polymer, methacrylate polymer, or combinations thereof.

Statement 18. The fracturing fluid of statement 16 or 17 wherein the associative polymer is present in an amount of about 1 lb/1000 gal to about 30 lb/1000 gal.

Statement 19. The composition of any one of statements 16 to 18 wherein the clay nanoparticles comprise hecrotite, smectite, or combinations thereof.

Statement 20. The composition of any one of statements 16 to 19 wherein the clay nanoparticles are present in an amount of about 0.5% to about 10% by weight of the associative polymer.

According to the present disclosure, a fracture may be created and/or extended by any suitable means. Such means are well-known to those skilled in the relevant art. For example a common method may include injecting a pre-pad or pad fluid, to initiate the fracturing of a subterranean formation prior to the injection of a proppant. In such examples, the pre-pad or pad fluid may be proppant-free or substantially proppant-free. The proppant may be suspended in a slurry with an associative polymer and clay nanoparticles as previously described which may be injected into the subterranean formation to create and/or extend at least one fracture. In order to create and/or extend a fracture, a fracturing fluid is typically injected into the subterranean formation at a rate sufficient to generate a pressure above the fracture gradient.

Fracking operations can involve packing relatively high volumes of proppant within a fracture. In such operations, a single homogeneous proppant pack is typically formed, which may be used to abut the fracture so that production fluids can be recovered through to the relatively small interstitial spaces between the tightly packed proppant. In some methods of the present application, a fracturing fluid may be introduced into a subterranean formation after the pre-pad or pad fluid. The fracturing fluid may include the associative polymer, clay nanoparticles, and the carrier fluid. The fracturing fluid may be injected in small volumes and alternated between proppant-free and proppant-laden fluid. The proppant-free fluid intermittently injected into the fracture with the fracturing fluid that is proppant laden will be referred to herein as a "spacer fluid." This spacer fluid may be any suitable fluid such as, without limitation, water, slickwater, or an aqueous gel including an aqueous base fluid, and a gelling agent (such as an associative polymer). The spacer fluid may be the same fluid as the fracturing fluid including the proppant particulates without the proppant particles.

A method of treating a subterranean formation may include creating at least one fracture in the subterranean formation, providing a fracturing fluid, providing a spacer fluid, alternately injecting a spacer fluid and the fracturing fluid into the fracture such that a proppant is disposed in the fracture. Creating the fracture may include injecting a fracturing fluid that is proppant-free into the subterranean formation at a pressure that is above a fracture gradient. The step of providing a fracturing fluid may include hydrating the associative polymer and adding the hydrated polymer, clay nanoparticles, and carrier fluid to a holding or mixing tank. The hydrating fluid may be the same as the carrier fluid. The method may further include flowing back the injected fluids from the fracture to remove at least a portion of the fluids from the fracture such that the subterranean formation fluids may enter the fracture. The fracturing fluid may be transported into the subterranean formation through a tubular and the spacer fluid may be transported into the subterranean formation through an annulus between the tubular and the subterranean formation or thought the same tubular as the fracturing fluid.

In various examples, systems configured for delivering the treatment fluids described herein to a downhole location are described. In various examples, the systems can include a pump fluidly coupled to a tubular, the tubular containing fracturing fluid including a proppant or a fracturing fluid without proppant.

The pump may be a high pressure pump in some examples. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some examples, the high pressure pump may be capable of fluidly conveying particulate matter, such as proppant, into the subterranean formation. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be fluidly coupled to a high pressure pump that is fluidly coupled to the tubular. That is, in such examples, the low pressure pump may be configured to convey the treatment fluid to the high pressure pump. In such examples, the low pressure pump may "step up" the pressure of the treatment fluid before it reaches the high pressure pump.

In some examples, the systems described herein can further include a mixing tank that is upstream of the pump and in which the treatment fluid is formulated. In various examples, the pump (e.g., a low pressure pump, a high pressure pump, or a combination thereof) may convey the treatment fluid from the mixing tank or other source of the treatment fluid to the tubular. In other examples, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole The FIGURE shows an illustrative schematic of a system that can deliver the fracturing fluids described herein to a downhole location, according to one or more examples. It should be noted that while the FIGURE generally depicts a land-based system, it is to be recognized that like systems may be operated in subsea locations as well. As depicted in the FIGURE, system 1 may include mixing tank 10, in which a fracturing fluid may be formulated. The fracturing fluid may be conveyed via line 12 to wellhead 14, where the fracturing fluid enters tubular 16, tubular 16 extending from wellhead 14 into subterranean formation 18. Upon being ejected from tubular 16, the fracturing fluid may subsequently penetrate into subterranean formation 18. Pump 20 may be configured to raise the pressure of the fracturing fluid to a desired degree before its introduction into tubular 16. The fracturing fluid may be introduced into subterranean formation 18 at any stage of a fracturing operation. For example, the fracturing fluid may be introduced into the subterranean formation 18 after one or more factures have been initiated. Fractures may be introduced for example by a pad stage. It is to be recognized that system 1 is merely exemplary in nature and various additional components may be present that have not necessarily been depicted in the FIG. 1n the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the fracturing fluid may, in some examples, flow back to wellhead 14 and exit subterranean formation 18. In some examples, the fracturing fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

To facilitate a better understanding of the present disclosure, the following examples of certain aspects of some of the systems, methods and cement compositions are given. In no way should the following examples be read to limit, or define, the entire scope of the disclosure.

Example 1

A first sample was prepared with water 20 lb./1000 gal. (2.396 kg/m$^3$) associative polymer. 4 lb./gal (0.4793 kg/L) of 20/40 Ottawa sand was added and then the sample was heated to 200° F. (93.33° C.). It was observed that the proppant had completely settled out of the solution after 3 hours.

A second sample was prepared with 20 lb./1000 gal. (2.396 kg/m$^3$) associative polymer and 0.5% by weight hectorite clay nanoparticles. 4 lb./gal (0.4793 kg/L) of 20/40 Ottawa sand was added and then the sample was heated to 200° F. (93.33° C.). It was observed that the proppant was still suspended in solution after 16 hours.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A fracturing fluid comprising:
    a carrier fluid;
    an associative polymer, wherein the associative polymer comprises at least a water-soluble polymer backbone and at least one hydrophobic segment having one or more hydrophobes comprising 10 to 24 carbon atoms, wherein the one or more hydrophobes are present in the associative polymer in an amount from about 10% to about 40% by weight of the associative polymer, and wherein the associative polymer is present in the fracturing fluid in an amount of about 1 pound per 1000 gallons to about 60 pounds per 1000 gallons;
    clay nanoparticles, wherein the clay nanoparticles are present in an amount of about 0.5% to about 10% by weight of the associative polymer; and
    proppant, wherein the proppant is present in an amount of 1 pound per gallon to about 20 pounds per gallon, wherein the proppant is suspended in a gel formed by the associative polymer with at least a portion of the clay nanoparticles occupying interstitials of the gel, and wherein settling of the proppant in the fluid is reduced with respect to a fracturing fluid without the clay nanoparticles.

2. The fracturing fluid of claim 1, wherein the carrier fluid comprises aqueous fluids, non-aqueous fluids, slickwater fluids, aqueous gels, viscoelastic surfactant gels, foamed gels, emulsions, and any combination thereof.

3. The fracturing fluid of claim 1, wherein the carrier fluid comprises aqueous fluid selected from the group consisting of fresh water, saltwater, brine, seawater, or any combination thereof.

4. The fracturing fluid of claim 1, wherein the associative polymer is present in an amount of about 1 lb/1000 gal to about 30 lb/1000 gal.

5. The fracturing fluid of claim 1, wherein the associative polymer has a molecular weight of about 10,000 Daltons to about 10,000,000 Daltons.

6. The fracturing fluid of claim 1, wherein the associative polymer comprises an acrylamide polymer, methacrylamide polymer, acrylate polymer, methacrylate polymer, or combinations thereof.

7. The fracturing fluid of claim 1, wherein the at least one hydrophobe is selected from the group consisting of linear or branched alkyl, alkenyl, cycloalkyl, aryl, alkaryl, aralkyl hydrocarbons; halo-substituted alkyl, cycloalkyl, aryl, alkylaryl, acryloyl, hydrocarbons; and mixtures thereof.

8. The fracturing fluid of claim 1, wherein the associative polymer comprises at least 0.25 to about 25 hydrophobic segments per molecule.

9. The fracturing fluid of claim 1, wherein the clay nanoparticles comprise hectorite, smectite, or combinations thereof.

10. The fracturing fluid of claim 1, wherein the clay nanoparticles have a mean particle size of less than 200 nm.

11. The fracturing fluid of claim 1, wherein the hydrophobes are hydrophobic groups obtained by either HASE (direct synthesis pathway) or HEUR (post addition of hydrophobic groups to a hydrophilic chain).

12. The fracturing fluid of claim 1, wherein the associative polymers comprise polymers obtained by micellar radical polymerization process.

13. The fracturing fluid of claim 1, wherein a hydrophobe is coupled to the water-soluble polymer backbone by a coupling group.

14. The fracturing fluid of claim 1, wherein the formed gel has a higher thermal stability than the fracturing fluid without the clay nanoparticles.

15. The fracturing fluid of claim 1, wherein the associative polymer comprises a hydrated associative polymer.

16. The fracturing fluid of claim 1, wherein the carrier fluid comprises a nonaqueous fluid selected from the group consisting of an organic liquid, a hydrocarbon, an oil, an ester, and any combination thereof.

17. A fracturing fluid comprising:

a carrier fluid;

an associative polymer comprising at least one hydrophobe comprising from 1 to 24 carbons, wherein hydrophobes are present in the associative polymer in an amount from about 10% to 40% by weight of the associative polymer, and wherein the associative polymer is present in the fracturing fluid in an amount of about 15 pounds per gallon to about 25 pounds per gallon;

clay nanoparticles, wherein the clay nanoparticles comprise synthetic hectorite and are present in an amount of about 0.5% to about 10% by weight of the associative polymer; and proppant, wherein the proppant is present in an amount of about 1 pound per gallon to about 20 pounds per gallon, wherein the proppant is suspended in a gel formed by the associative polymer with at least a portion of the clay nanoparticles occupying interstitials of the gel, and wherein settling of the proppant in the fluid is reduced with respect to a fracturing fluid without the clay nano particles.

18. The fracturing fluid of claim 17, wherein the carrier fluid comprises aqueous fluids, non-aqueous fluids, slickwater fluids, aqueous gels, viscoelastic surfactant gels, foamed gels, emulsions, and any combination thereof.

19. The fracturing fluid of claim 18, wherein the associative polymer comprises an acrylamide polymer, methacrylamide polymer, acrylate polymer, methacrylate polymer, or combinations thereof, present in an amount of about 1 lb/1000 gal to about 30 lb/1000 gal.

20. The fracturing fluid of claim 18, wherein the at least one hydrophobe is selected from the group consisting of linear or branched alkyl, alkenyl, cycloalkyl, aryl, alkaryl, aralkyl hydrocarbons; halo-substituted alkyl, cycloalkyl, aryl, alkylaryl, acryloyl, arylalkyl hydrocarbons; and mixtures thereof.

* * * * *